United States Patent
Niwa et al.

(10) Patent No.: US 8,390,245 B2
(45) Date of Patent: Mar. 5, 2013

(54) COMMUNICATION DEVICE FOR VEHICLE

(75) Inventors: Toshiaki Niwa, Okazaki (JP); Kazuya Kato, Okazaki (JP)

(73) Assignees: Toyota Jidosha Kabushiki Kaisha, Toyota (JP); Aisin AW Co., Ltd., Anjo (JP)

(*) Notice: Subject to any disclaimer, the term of this patent is extended or adjusted under 35 U.S.C. 154(b) by 464 days.

(21) Appl. No.: 12/448,810

(22) PCT Filed: Jul. 18, 2008

(86) PCT No.: PCT/JP2008/063461
§ 371 (c)(1),
(2), (4) Date: Jul. 8, 2009

(87) PCT Pub. No.: WO2009/014228
PCT Pub. Date: Jan. 29, 2009

(65) Prior Publication Data
US 2010/0039069 A1 Feb. 18, 2010

(30) Foreign Application Priority Data
Jul. 24, 2007 (JP) ................................ 2007-192454

(51) Int. Cl.
H02J 7/14 (2006.01)
H02J 7/00 (2006.01)
B60K 6/20 (2007.10)

(52) U.S. Cl. ........ 320/104; 320/109; 320/132; 320/152; 180/65.21; 903/903; 903/907

(58) Field of Classification Search .................... 320/104
See application file for complete search history.

(56) References Cited

U.S. PATENT DOCUMENTS

| 6,487,477 | B1 | 11/2002 | Woestman et al. |
| 6,721,637 | B2 | 4/2004 | Abe et al. |
| 8,054,048 | B2* | 11/2011 | Woody et al. ............... 320/162 |
| 2003/0015358 | A1 | 1/2003 | Abe et al. |
| 2005/0024061 | A1* | 2/2005 | Cox et al. ................... 324/426 |
| 2006/0244411 | A1* | 11/2006 | Wobben ..................... 320/104 |
| 2009/0114463 | A1* | 5/2009 | DeVault ................... 180/65.29 |

FOREIGN PATENT DOCUMENTS

| JP | A-6-245325 | 9/1994 |
| JP | A-10-208194 | 8/1998 |
| JP | A-10-232137 | 9/1998 |
| JP | A-2003-32803 | 1/2003 |
| JP | A-2003-47110 | 2/2003 |
| JP | A-2005-266510 | 9/2005 |
| JP | A-2007-88929 | 4/2007 |
| JP | A-2007-159359 | 6/2007 |

OTHER PUBLICATIONS

International Preliminary Report on Patentability issued in International Patent Application No. PCT/JOP2008/063461 on Feb. 9, 2010 (with translation).

* cited by examiner

*Primary Examiner* — Edward Tso
*Assistant Examiner* — Ahmed Omar
(74) *Attorney, Agent, or Firm* — Oliff & Berridge, PLC

(57) ABSTRACT

A power cable is connected from an external commercial power supply, and an in-vehicle battery is charged. Using the power cable as a communication conduit, communication is conducted with the outside world. In particular, by communication during charging, regional information regarding the current location, where the charging is being performed, or regional control parameter information is obtained. A control parameter of a vehicle is then set in accordance with the obtained information.

10 Claims, 1 Drawing Sheet

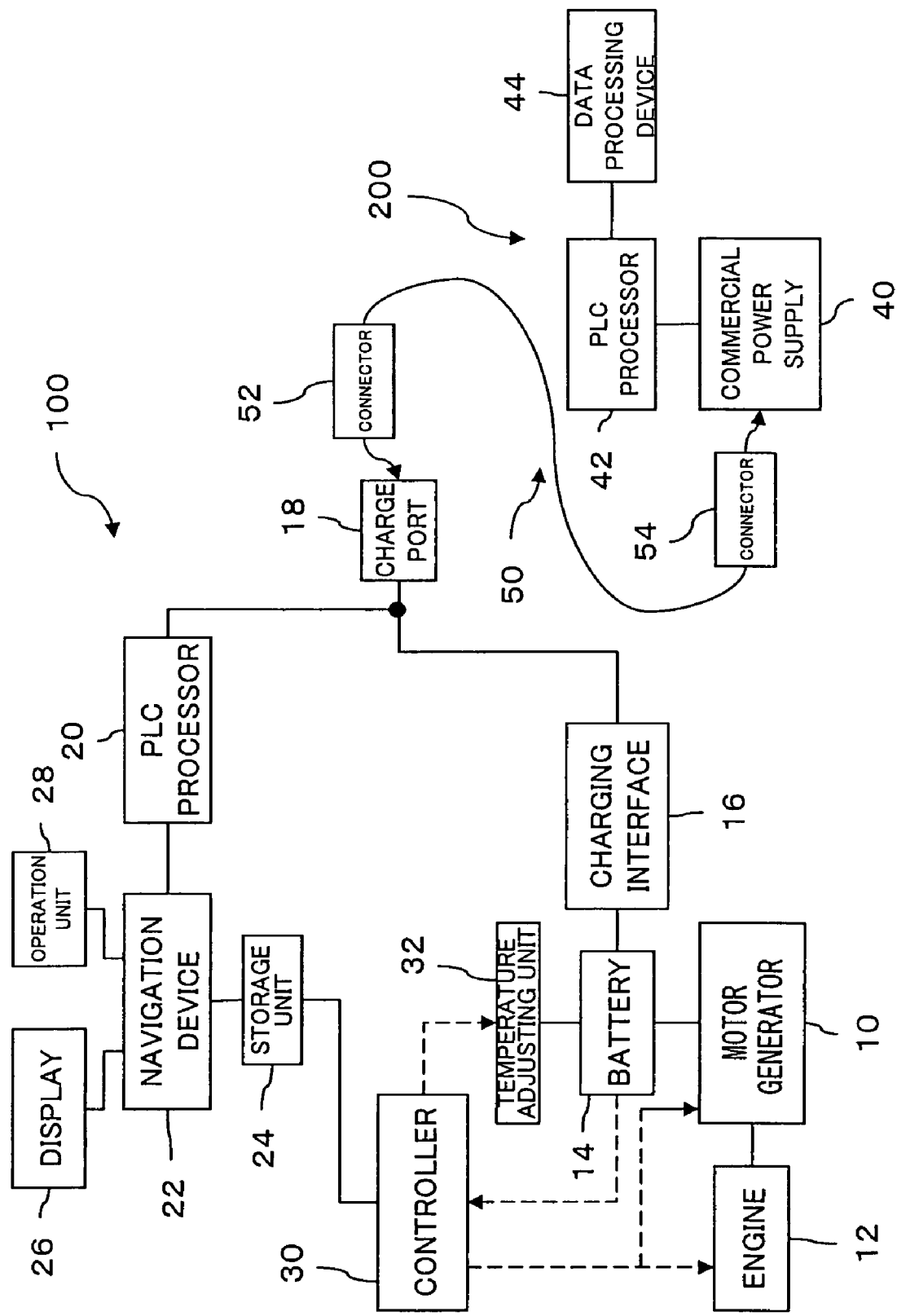

COMMUNICATION DEVICE FOR VEHICLE

TECHNICAL FIELD

The present invention relates to obtaining control parameters for a vehicle.

BACKGROUND ART

The advantages of electric vehicles, including that, unlike gasoline-powered vehicles, electric vehicles do not emit exhaust gases, and that they operate quietly, have been well known for years. Because electric vehicles are powered by electric power from a battery, it is necessary to charge (re-charge) the battery, and, to enable charging the battery at wide variety of locations, it is preferable a built-in rectifier connectable to a standard power outlet be provided. In this way, charging using an ordinary home outlet becomes possible.

During charging, a power supply and a vehicle are connected via a cable, which passes an AC current for charging. Systems for enabling communication by superimposing data onto such an electric power current, such as that disclosed in Patent Document 1 (Japanese Patent Publication JP2007-88929A) have been proposed. With such a systems, it becomes possible to transfer image data or the like captured by an in-vehicle device to a device on the power supply side.

DISCLOSURE OF THE INVENTION

Objects to be Achieved by the Invention

It should be noted that the efficient operation of a typical vehicle depends upon the appropriate functioning of a variety of devices mounted on the vehicle. Therefore, there is a need to optimally control these various devices. For example, Patent Document 1 (JP 2007-88929 A) proposes changing the usage ratio between an engine and a motor according to the geographical region where the vehicle is located. Thus, there is a desire to facilitate appropriate settings to enable efficient running of the vehicle.

Means for Achieving the Objects

The present invention provides a vehicle communication system in which an in-vehicle battery is charged from an external power supply connected thereto via an electric power line and external communications are enabled using the electric power line as a communication conduit. The vehicle communication system is characterized in that, through the communication performed during charging, information identifying the location geographical area where the charging is being performed or control parameter information specific to the current location is obtained and a control parameter of the vehicle is set in accordance with the obtained information.

It is preferable that the control parameter relates to a charging and discharging control of the battery.

It is further preferable that the control parameter is an upper or lower limit setting value in a charging and discharging control of the battery.

It is further preferable that the control parameter relates to a battery temperature control.

Effects of the Invention

As explained above, in accordance with the present invention, local information for a current location is obtained through communication during charging by using an electric power line as a communication conduit, and vehicle control parameters are set changed in accordance with the obtained regional information. Therefore, required information is easily obtained enabling efficient control of onboard equipment (devices).

BRIEF DESCRIPTION OF THE DRAWINGS

FIG. 1 is a diagram showing the overall configuration of a system according to one embodiment of the present invention.

BEST MODE FOR CARRYING OUT THE INVENTION

Preferred embodiments of the present invention are described below with reference to the accompanying drawing.

FIG. 1 is a block diagram showing an overall configuration of an information transmission system according to one embodiment of the present invention. FIG. 1 shows a system including a vehicle 100, a charging station 200, and a charging cable 50.

The vehicle 100 is a hybrid vehicle including a motor generator 10 and an engine 12. That is, the vehicle is able to travel by using either the driving force of either the motor generator 10 or the engine 12 to drive the wheels. The motor generator 10 is also able to generate power using the driving force of the engine. It is also preferable to provide two motor generators, one used primarily for propelling the vehicle, and the other mainly for generating electric power.

A battery 14 is connected to the motor generator 10. The motor generator 10 is driven by electric power from the battery 14, which is charged by the electric power generated by the motor generator 10. As such, external charging of the vehicle 100 is possible. It is further possible to provide a battery 14 with a comparatively large capacity to enable running as an electric vehicle for a comparatively long distance without driving the engine 12. In other words, the vehicle 100 runs in the hybrid vehicle (HV) mode by driving the engine 12 as necessary and in the electric vehicle (EV) mode by driving the motor generator 10 with the electric power from the battery 14.

In present embodiment of the present invention, a controller 30 is provided for controlling various in-vehicle devices. In this embodiment, the controller 30 controls an operation of devices such as the engine 12, the motor generator 10, and a temperature adjusting unit 32 which adjusts the temperature of the battery 14. The temperature adjusting unit 32 has a function for cooling and heating a battery. For example, the temperature adjusting unit 32 may include a cooling fan for cooling the battery 14 by blowing air and a heater for heating the battery 14. The controller 30 detects the battery temperature using a thermometer provided to the battery 14 and controls the temperature adjusting unit 32 to maintain the battery temperature at a predetermined value. When the battery temperature is low, such as at a start-up, the battery 14 is heated by the heater. On the other hand, when the temperature is high, such as when a continuous flow of large electric current causes a temperature rise over an appropriate value, the battery 14 is cooled by the cooling fan.

Further, the controller 30 controls the driving of the engine 12 so that the state of charge (SOC) of the battery is maintained at about 50% in the HV mode. For example, control is performed in such a manner that, when the SOC drops blow 40%, the engine 12 is driven to generate electric power, while when the SOC exceeds 60%, the engine 12 is stopped. Further, running in the EV mode is allowed at SOC values of 20% or more, while the mode is changed to the HV mode when the SOC drops below 20%, in order to enable charging of the battery 14. Once charging has been initiated, a charging interface 16 described below is controlled to allow charging until the SOC recovers to 90%.

The charging interface 16 is connected to the battery 14. The charging interface 16 has a built-in rectifier which converts externally-supplied AC power into DC power before supplying the power to the battery 14. To the charging interface 16 is connected a charge port 18, an AC-power receiving port with a shape similar to a plug. Therefore, it is possible to supply AC power from an external power source into the charging interface 16 by inserting a connector having a shape similar to a power outlet into the charge port 18. It is preferable that the charge port 18 is connectable to a 100 V or 200 V commercial power supply, and further that the charge port 18 has a shape conforming to standard connectors.

A PLC processor 20 is connected to the AC power channel between the charging interface 16 and the charge port 18. The PLC processor 20 retrieves high-frequency signals superimposed on the AC current and demodulates the retrieved signals to extract data. The PLC processor 20 also superimposes the high-frequency signals obtained by modulating data onto the AC power channel. In this example, the AC power supplied from an external power supply is 50 or 60 Hz and the high-frequency signals superimposed on this AC power are signals generally in a band between 2 to 30 MHz. "PLC" stands for Power Line Communication. As long as it is possible for the PLC processor 20 to select signals for communicating with an external device via the charge port 18, the frequency or the like is not limited. The high-frequency signals have a high carrier frequency as described above. A modulation wave can be obtained by demodulation, and the modulation wave is used as an information signal. As a modulation system, various analog or digital modulation systems can be employed.

The PLC processor 20 has a navigation device 22 connected to it. The navigation device 22 is provided with a mass storage unit 24 such as a hard disk.

The navigation device 22 displays a map on a display 26 using map data stored on a DVD or the like, while indicating a current location detected by a GPS or the like on the display. When a target location is set, a route from the current location to the target location is determined and route guide is performed by showing the route on the map. Various data may be input through an operation unit 28, which preferably includes a touch panel, using the display 26.

In this embodiment, the navigation device 22 is used to communicate with an external device via the PLC processor 20 in order to store various data in the storage unit 24. Especially, the controller 30 is also connected to the storage unit 24. Control parameters used in the control by the controller 30 are modified by the data stored in the storage unit 24.

More specifically, when vehicles are exported to respective countries, before a vehicle is delivered to a customer through a dealer in that country, the vehicle 100 is first connected to a charging station 200 to charge the battery 14.

That is, a connector 52 of a power cable 50 which is an electric power line from an external power supply is connected to the charge port 18. The connector 52 has a shape which mates with the charge port 18. That is, the connector 52 has a shape of a plug in this example. The other end of the power cable 50 is connected via a connector 54 to a commercial power supply 40 (external power supply) at the charging station 200. The commercial power supply 40 has a connecting portion of a general power outlet type into which the plug-type connector 54 is inserted.

A PLC processor 42 is connected to the commercial power supply 40, and a data processing device 44 is connected to the PLC processor 42. Thus, communication between the data processing device 44 and the navigation device 22 is possible via the PLC processor 42. It is further possible to store the data, which is stored in the storage unit 24, in an internal storage unit in the data processing device 44, or to supply the data in the data processing device 44 to the navigation device 22, and further to the storage unit 24 where the data is stored.

In this embodiment, the data processing device 44 is a computer located at a dealership. The data processing device has information regarding vehicle control parameters in accordance with regional characteristics of the country. During charging, the navigation device 22 of the vehicle 100 sends its vehicle information, such as a vehicle model, stored in the storage unit 24. The data processing device 44 stores vehicle parameters which are appropriately set for each country (or each region) for each vehicle model, and sends these control parameters to the storage unit 24 where these control parameters are stored.

The control parameters stored in the storage unit 24 are supplied to an electronic control unit (ECU) which uses these parameters, and then the control parameters in the ECU are overwritten. Therefore, during subsequent operation, operations of various devices are controlled by the newly overwritten control parameters which are set depending on each region and thus suitable running control is performed.

Although in the example just described the control parameters are sent from the data processing device 44, it is also possible to pre-store control parameters optimized for each country or region in the navigation device 22, and use the data processing device 44 merely to supply the regional data. This method also enables overwriting control parameters in the storage unit 24 by the navigation device 22, so the control parameters in each ECU can be overwritten by the parameters which are optimally set for each region.

The following Table 1 shows example possible control parameters:

TABLE 1

| No. | Information for Each Country | Object of Control |
| --- | --- | --- |
| 1 | Day/night temperature | Power of a cooling fan for a battery or the like. |
| 2 | Availability of charging facilities | Battery usage ratio (for example, the ratio can be increased where charging facilities are common). |
| 3 | Terrain (mountainous, flat, etc.) | Level of battery charge can be controlled to stay at high level for enabling "additional motor output" to engine output. |
| 4 | Sunlight information | Amount of charge at home is adjustable based on the amount of expected supplemental charge by solar panels in case of white nights or the like. |

As shown above, (1) where the temperature tends to be high, the power of the cooling fan in the temperature adjusting unit 32 can be increased, or the operating time can be set longer. At locations where the temperature drops extremely at night, heating of the battery 14 (warm-up) in the mornings can be set higher. (2) A common lower limit of the SOC in the EV mode is around 20%. However, it is possible to lower the limit down to around 15%. (3) Instead of a common SOC target of 50%, 60% may be applied. (4) For example, it is possible to charge up to 80% by commercial electric power and charge the rest by the electric power from solar panels.

As such, with the present invention, it is possible to obtain, during charging by communications via power cable, information specific to the location where the vehicle is located. Therefore, control parameters can be appropriately set in advance before the vehicle is operated.

Hybrid vehicles which are chargeable from an external power supply have specific control parameters, such as control parameters for the battery 14 and control parameters for the HV mode. It is preferable that these control parameters are overwritten depending on a region. Especially, control parameters can be optimized for a hybrid vehicle by changing control parameters which relate to both of charging and running, such as a battery usage range and a battery temperature control.

Although in the example described above the control parameters are overwritten at a dealership, the control parameters may also be obtained during charging at home by connecting to a dealer's server via the Internet or the like.

Furthermore, when overwriting control parameters, it is preferable that a user confirmation input is requested on the display 26 and that overwriting is performed only after receiving a permission input from the operation unit 28. It is also preferable that the storage unit 24 stores both the old and new settings so that an original setting of a control parameter can be restored even after the control parameter was once overwritten.

Further, it is preferable that when changing control parameters related to battery charge control from an external power supply, in order to avoid conflict between update time of the control parameters and charge time of the battery, either one of the update starting time of the control parameters and the charge starting time of the battery is delayed from the other. In this way, interference between changing the control parameters related to battery charge control and performing charge control by using parameters related to battery charge can be avoided. When changing control parameters related to battery charge control from an external power supply, it is more preferable that charging of the battery is started after the update of the control parameters is completed. In this way, a regionally-optimized control for battery charge from an external power supply can be applied at an earlier opportunity.

In the above embodiments, an example of the present invention applied to a hybrid vehicle is described. However, the present invention is not limited to hybrid vehicles, but may be applied to any vehicles in which an external power supply is connected to an in-vehicle battery via power cable and the in-vehicle battery is charged by the external power supply. For example, the present invention is applicable to electric vehicles which do not have an engine and run on only a motor driven by an in-vehicle battery; so-called "series hybrid vehicles" in which an engine is used only for driving a power generator, and not for directly driving the vehicle; parallel hybrid vehicles which run on a driving force of a combination of an engine and a motor; and fuel cell hybrid vehicles which run on electric power generated by a fuel cell along with electric power stored in a battery.

The invention claimed is:

1. A vehicle communication system in which an in-vehicle battery is charged from an external power supply connected thereto via an electric power line and external communication using the electric power line as a communication conduit is enabled, the vehicle communication system characterized in that:
   through external communication performed during charging, the vehicle communication system transmits vehicle information and receives control parameter information that is set in accordance with one or more characteristics of a geographical area where the charging is performed and the transmitted vehicle information, and
   a control parameter of a vehicle is set in accordance with the received control parameter information.

2. The vehicle communication system according to claim 1,
   wherein the control parameter relates to charging and discharging control of the battery.

3. The vehicle communication system according to claim 1,
   wherein the control parameter is an upper or lower limit setting value in charging and discharging control of the battery.

4. The vehicle communication system according to claim 1,
   wherein the control parameter relates to a battery temperature control.

5. A vehicle charging system, comprising:
   an in-vehicle battery configured to be charged from an external power supply connected thereto via an electric power line; and
   a vehicle communication system configured to perform external communication using the electric power line as a communication conduit, wherein
   through external communication performed during charging, the vehicle communication system transmits vehicle information and receives control parameter information that is set in accordance with one or more characteristics of a geographical area where the charging is performed and the transmitted vehicle information, and
   a control parameter of a vehicle is set in accordance with the received control parameter information.

6. The vehicle communication system according to claim 5,
   wherein the control parameter relates to charging and discharging control of the battery.

7. The vehicle communication system according to claim 5,
   wherein the control parameter is an upper or lower limit setting value in charging and discharging control of the battery.

8. The vehicle communication system according to claim 5,
   wherein the control parameter relates to a battery temperature control.

9. The vehicle communication system according to claim 1,
   wherein the vehicle information includes vehicle model information.

10. The vehicle charging system according to claim 5,
    wherein the vehicle information includes vehicle model information.

* * * * *